G. ANDEREGG.
CHAIN TIGHTENER AND LOCK.
APPLICATION FILED MAR. 31, 1919.
1,352,339. Patented Sept. 7, 1920.
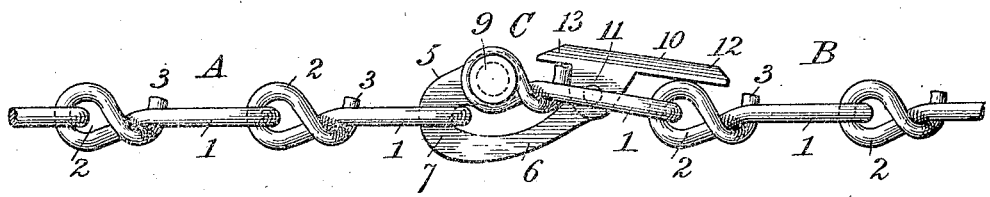
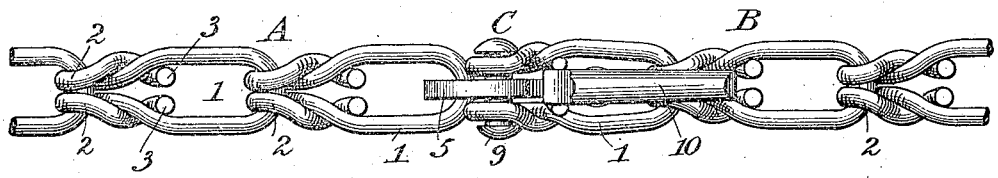
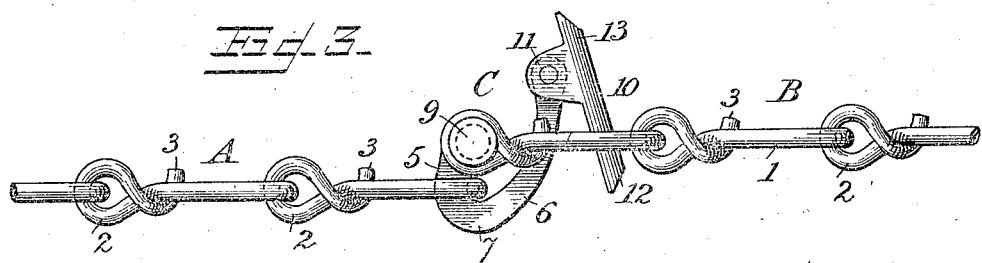
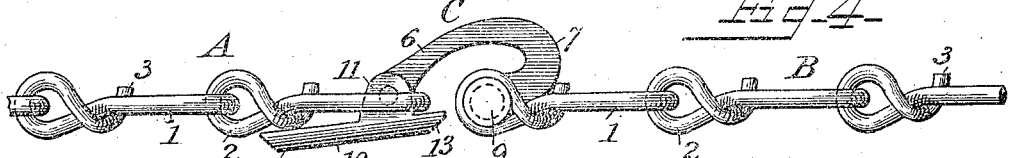
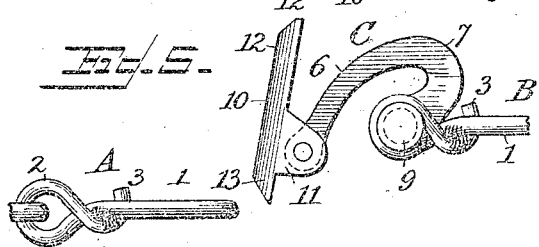
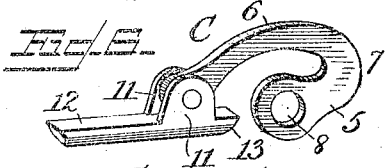
George Anderegg
INVENTOR
WITNESSES
Charles N. Ourand
F. P. Smith
BY
ATTORNEY

UNITED STATES PATENT OFFICE.

GEORGE ANDEREGG, OF SHERIDAN, WYOMING, ASSIGNOR OF ONE-HALF TO ROY C. TARRANT, OF SHERIDAN, WYOMING.

CHAIN TIGHTENER AND LOCK.

1,352,339.  Specification of Letters Patent.  Patented Sept. 7, 1920.

Application filed March 31, 1919. Serial No. 286,461.

*To all whom it may concern:*

Be it known that I, GEORGE ANDEREGG, a citizen of the United States, residing at Sheridan, in the county of Sheridan and State of Wyoming, have invented a new and useful Chain Tightener and Lock, of which the following is a specification.

This invention relates to chain adjusting and locking devices, and has for its object to provide a device connected to one end of a chain or to one chain and adapted to engage with another chain end or another chain for drawing the two ends of the chain or the two chains together and locking the same, provision being made for the ready disengagement of said device from the chain or chains, when desired, said device containing a locking element which is proof against accidental unlocking.

The invention is primarily designed for use in securing together the side members of anti-skid attachments for automobile wheels which usually employ side chains and transverse connecting chains or elements, though it is obvious that the invention has a much wider range of use and may be employed for connecting chains or parts of chains for any desired purpose.

The invention consists in the construction of said device and its mode of application to the chain, all as hereinafter specifically pointed out, it being understood that while the drawing shows the preferred embodiment of the invenion, the latter is not to be considered as limited strictly thereto, and I reserve the right to make such changes in the form, size, proportion and minor details of construction as fairly come within the scope of the appended claims.

In the accompanying drawing Figure 1 is a side elevation showing the chain tightener and lock applied to the adjoining ends of a chain or chains, and illustrating it in its locked position.

Fig. 2 is a top plan view of the same.

Fig. 3 is a side view illustrating one of the steps in unlocking or disconnecting the device from the chain or chains.

Fig. 4 is a similar view showing a further movement of the said device toward unlocking.

Fig. 5 is a similar view showing the final or unlocking position, and illustrating also the initial step in applying the device.

Fig. 6 is a perspective view of the locking device detached.

Like reference characters designate corresponding parts in the several figures of the drawing.

Referring to the drawing, I have shown two chain sections designated A, B, which may represent the two ends of side chains, such as are employed in connection with certain types of anti-skid attachments. However, in other relations, the two sections A and B may represent the adjoining ends of different chains, for the device may be used for coupling or connecting the ends of a single chain or the ends of two chains, as may be desired.

In the form of chain shown in the drawing, each link consists essentially of a horizontal loop portion 1, and a vertically disposed eye 2, at one end of the loop portion and at right angles thereto, the said link being formed of a single piece of wire, the ends 3, 3 of which at one end of the loop are brought together and hooked about the sides of the loop. The eye is made double, the two eyes being spaced and alined, while the cross bar of the loop at the other end of the link is curved. This is a common form of chain link and no novelty is claimed herein for the same. I have simply described the construction in order that the application of my invention thereto may be better understood.

The device C, which constitutes my invention, is of the specific form shown in Fig. 6 of the drawing. Mechanically speaking it is a lever substantially J-shaped in outline, comprising a short arm 5, and a long arm 6, the two arms where joining forming a curved hook 7, and the long arm being curved inwardly. At the terminal of the short arm a transverse opening 8 is provided, which receives a rivet 9, which passes transversely through the eye 2, of the end link of the chain, and serves as a pivot upon which said lever turns. The rivet is headed at both ends so as to permanently retain the lever in place. The purpose of the hook 7, which is disposed at one side of the vertical and horizontal planes of the rivet, is to receive the curved cross bar of the link of the chain to be connected, a seat being provided in said hook 7 in order to better receive the curved end of the link.

At the terminal of the long arm of the lever a transverse opening is provided, through which is passed a rivet for the pivotal connection thereto of a locking bar or element 10, depending ears 11 being provided thereon between which ears the end of the long arm is received and pivoted as stated. The locking bar or element is pivoted to the end of the long arm of the lever at a point of its length nearer one end than the other, thereby providing a long arm 12 and a short arm 13, the long arm forming a continuation of the long arm of the lever when in locked position (Fig. 1), and folding inwardly by gravity when being unlocked (Fig. 3). The short arm, when the locking bar is in locked position, as shown in Figs. 1 and 2 of the drawing, lies both between and above the hooked ends 3 of the same link in which the lever is pivotally mounted, while the long arm, which is of greater length than the loop of the link, extends beyond the closed curved end of said link and lies above the eye of the next adjacent link.

By reason of this disposition of the locking bar or element, it is practically impossible for the device C to become accidentally disconnected from the chain end A, for in order to disengage the locking bar or element from the loop of the link carrying the said lever, the lever has to be turned from the position shown in Fig. 1 to the position shown in Fig. 3, an operation which would not likely take place accidentally. Even in such event, however, the locking bar or element would assume the position shown in Fig. 4 of the drawing, in engagement with the loop of the link of the adjacent chain or chain end, from which position the locking bar or element must be turned by hand into the position shown in Fig. 5 before the device can become disconnected from the chain 8.

It will be noted that in applying the J-shaped lever to the end link of the chain or chain end B, the two ends of the wire forming the eye or eyes 2, are spread apart, as shown in Fig. 2 of the drawings, to admit the short arm of the lever therebetween, and this brings about a corresponding spreading of the space between the two hooked ends 3 of the link, in order that the lever may move freely in the space between said ends when being turned from its unlocked to its locked position or vice versa. This disposition of the parts brings the two spaced lugs 11, of the locking bar or element 10, in rear of the hooked ends of the link, as shown in Fig. 1.

As stated, Figs. 1 and 2 show the adjusted, locked position of the chain tightener and lock, while Figs. 3, 4 and 5 indicate the steps that are followed in unlocking said device; and viewing said figures in reverse order, beginning with Fig. 5, the steps pursued in connecting and locking the chain ends will be apparent.

In unlocking the two chain ends of chains A, B, the lever device C is given a quarter turn inwardly on its pivot 9, from the position shown in Fig. 1, freeing the long arm of the locking bar or element and allowing it to drop by gravity to the position shown in Fig. 3, after which both the long arm of the lever and the locking bar or element are drawn through the loop of the link to which said lever is pivotally connected and the lever is then swung in the reverse direction or outwardly from the position shown in Fig. 3 to the position shown in Fig. 4, said lever being given in this movement over a one-half revolution. In this position, the locking bar or element lies lengthwise along the underside of the loop of the first link of the chain end or chain A, and the device is still connected with both chains or chain ends.

To complete the unlocking, the lever must be moved downwardly through the loop of the link of chain end A, a sufficient extent to permit the locking bar or element to be folded inwardly, and allow both the lever and locking element to be passed upwardly out of the attached link, as shown in Fig. 5 of the drawing.

As stated, Figs. 5, 4, 3 and 1 represent the order pursued in applying the locking device to the chain or chain end A, with this exception, that after the device is passed through the loop of the end link of the chain end A, the locking bar or element is not opened out into the position shown in Fig. 4, but by continuous movement the locking bar or element and the lever are brought to the respective positions shown in Figs. 3 and 1.

Fig. 4 shows clearly that even if the locking bar or element, while in the position shown in Figs. 1 and 2, should accidentally drop through the loop of the link to which the device C is pivotally connected, the two chains or chain ends would still remain connected, since the locking bar or element would occupy a position along the loop of the end link of the chain A and would prevent the accidental disconnection of the said device therefrom.

It has been heretofore proposed to provide in a chain tightener and lock, a lever pivotally connected to the end link of a chain and having a locking bar pivoted to its end, but in the said construction the lever was not J-shaped in form, nor was it pivotally connected by a rivet to the end link, nor was it provided with a hook portion located at the junction of long and short arms of the lever, and the locking bar was not disposed in the position of the locking bar or element of the herein-described device. In the aforesaid construction the locking lever could easily slip through the chain link, whereas in this device the lever has to make several distinct movements on its pivot, as indicated by the figures of the drawing, before it can become unlocked.

My device is a safety chain in every sense of the term. It can be easily operated when full of mud, as would frequently be the case when used on an automobile wheel. There is no screw or spring to push or twist off, and by reason of the rivet connection, it can be applied to new or old chains with equal facility.

What I claim is:

1. In a chain tightener and lock employed in connection with a chain having a link provided with a loop and an eye, the combination with a substantially J-shaped lever composed of a long and short arm with a hook at the junction of said arms, means mounted in the eye of the link and having connection with the short arm of the lever for pivotally connecting the lever thereto, and a locking bar or element pivotally connected to the long arm of the said lever at a point nearer one end of said bar or element than the other, whereby the long arm of said bar or element may be folded inwardly along the long arm of the lever, when in its unlocked position.

2. The combination with a link of a chain, said link comprising a loop with a pair of spaced eyes at one end of said loop, and spaced and hooked ends engaging said loop, of a substantially J-shaped lever composed of a long and short arm, the short arm being provided with a transverse opening, means connecting the eyes and the short arm of the lever for pivotally connecting said lever to said link, said lever working between the spaced hooked ends of the link, and a locking bar or element pivotally connected to the long arm of said lever at a point nearer one end of the bar than the other, said locking bar element having a length greater than the loop of the link, so that when the device is in locked position said locking bar element extends beyond the said loop.

3. The combination with a link of a chain, said link comprising a loop with a pair of longitudinally disposed and spaced eyes at one end of the loop, and spaced and hooked ends engaging the inner side of said loop, of a substantially J-shaped lever comprising a long and a short arm, the short arm being pivotally mounted at its end between said spaced eyes, the longer arm carrying a pivotally mounted locking bar having in turn long and short arms, a curved section or hook joining the two arms of the lever and adapted to engage with a chain link, the locking bar being adapted to lock with the same link as that on which the lever is mounted, said spaced ends of the link receiving between them the short arm of the locking bar.

4. The combination with a chain having an end link comprising a loop and an eye at one end thereof, a substantially J-shaped lever, means for pivotally connecting the short arm of said lever to the eye of the link, a hook provided on said lever, at the junction of the long and short arms thereof, for the engagement therewith of the chain link to be connected, and a locking bar or element pivotally connected to the long arm of the lever at a point nearer one end than the other and being of greater length than the loop of said end link, said locking bar or element when in its folded or unlocked position having its long arm extending inwardly over the long arm of said lever, and when in unfolded or locked position, the long arm of the locking bar or element serves as a continuation of the long arm of said lever, the said lever and said locking element being respectively connected to and engaging one and the same link of the chain.

In testimony that I claim the foregoing as my own, I have hereto affixed my signature in the presence of two witnesses.

GEORGE ANDEREGG.

Witnesses:
   A. F. HARDER,
   BERT A. FRENCH.